May 7, 1946. G. A. TINNERMAN 2,399,899
BONDING CLAMP
Filed April 10, 1944

INVENTOR.
GEORGE A. TINNERMAN
BY Bates, Teare, & McDean
ATTORNEYS

Patented May 7, 1946

2,399,899

UNITED STATES PATENT OFFICE 2,399,899

BONDING CLAMP

George A. Tinnerman, Cleveland, Ohio, assignor to Tinnerman Products, Inc., Cleveland, Ohio, a corporation of Ohio Application April 10, 1944, Serial No. 530,332

1 Claim. (Cl. 174—40)

This invention relates to holders for conduits such as those that are used in airplanes, trucks, or tanks, and to a means for electrically grounding the conduits.

Conduits that are used for hydraulic lines or fuel lines, or as housing for movable rods or cables, must not only be securely supported, particularly where they are used in vehicles where intense vibration or relative structural movement takes place during the operation thereof, but must be supported in a way that will avoid any possibility of the clamp cutting the conduit and thereby rendering it unserviceable. It is desirable, therefore, to utilize a cushioning material upon the tube engaging face of the clamp so as to effect a satisfactory supporting structure, and at the same time to compensate for relative motion between the tube and the support consequent upon structural movement of one part of the vehicle with reference to the other during the use thereof.

In many vehicles, particularly in aircraft structures, it is desirable to ground all metallic parts to the framework so as to avoid the dangers resulting from the building up of a static charge in any part, but the desirability for a cushioning material on the conduit engaging face of the clamp presents the problem of assuring an adequate electrical bond between the clamp and the conduit.

An object of the present invention, therefore, is to make a conduit clamp which is light in weight and yet has sufficient cushioning qualities to make it suitable for use as a conduit support in vehicles that are subject to vibration, and at the same time will effectively ground the conduit to the framework of the vehicle through the supporting clamp. An additional object is to achieve the foregoing purpose in an economical manner.

Figure 1:
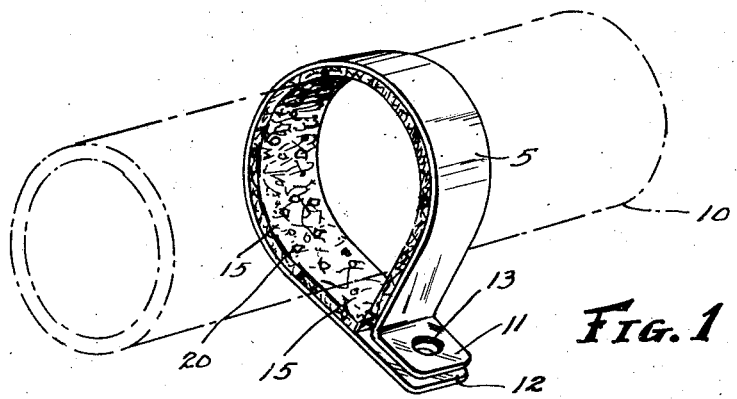
Figure 2:
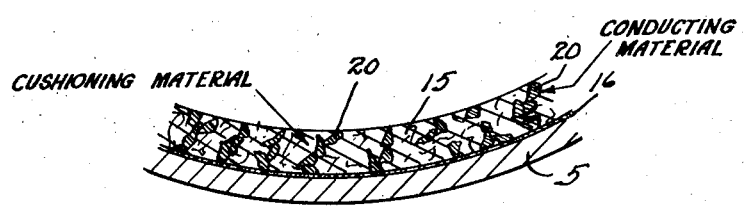

In the accompanying drawing, I have shown a conduit clamp embodying the present invention, wherein Fig. 1 is a perspective view illustrating a clamp embodying the present invention and Fig. 2 is a section taken longitudinally through a portion of the clamp.

The clamp which I have illustrated in the present invention comprises a strip of metal 5 which is bent intermediately to define a substantially closed circle for the purpose of embracing a conduit 10. One end 11 is bent at right angles so as to extend parallel to the other end 12, and each end portion has an opening 13 therein, through which a screw or bolt may be extended to draw the ends of the clamp together, and to fasten it to a supporting structure when a conduit is passed therethrough.

The inner face of the strip is covered with cushioning material 15 which may comprise a layer of flock in fibrous form that is adhesively connected to the clamping strip. In practice, this may be accomplished by applying a layer 16 of adhesive to the strip and then impinging the flock thereagainst while the adhesive is in a tacky condition. The coating of flock is sufficiently thick to provide the desired cushion between the tube and clamp, but the difficulty is that it is a poor electrical conductor.

To provide a satisfactory electrical bond, therefore, between the tube and clamp, I intermingle electrically conductive material 20 in comminuted form with the flock and blow the commingled material against the adhesive. The conductive material may comprise metallic particles that are thoroughly mixed with the flock either before or at the time of the application thereof to the clamp. In addition, the adhesive may comprise any suitable electrically conductive cement.

An important advantage of the present invention is the fact that a cushion may be effectively provided between a conduit and a clamp in an economical manner, and at the same time a satisfactory electrical bond may be obtained therebetween. The cushioning and bonding material is in such form that it may be applied with a blowgun, hence, the application of the material to the clamp may be expeditiously accomplished.

I claim:

An electrical clamp for securing an element to be grounded, comprising, a metal strip defining a loop, means for securing the loop to said element and to a support for grounding the same, a conducting coating on the inside face of said loop comprising a mixture of flock fibres and intermingled particles of electrically conductive material applied to the strip of metal to a thickness sufficient to define a layer providing a cushion which is adapted to minimize wear on the element supported by the clamp and which cushion provides an electrical bond from the element and through the clamp by means of said particles of electrically conductive material.

GEORGE A. TINNERMAN.